US011897276B2

(12) United States Patent
Ding

(10) Patent No.: US 11,897,276 B2
(45) Date of Patent: *Feb. 13, 2024

(54) ARTIFICIAL TEXTURED STONE SLAB AND METHODS OF MANUFACTURING THEREOF

(71) Applicant: Guoxing Ding, Foshan (CN)

(72) Inventor: Guoxing Ding, Foshan (CN)

(*) Notice: Subject to any disclaimer, the term of this patent is extended or adjusted under 35 U.S.C. 154(b) by 0 days.

This patent is subject to a terminal disclaimer.

(21) Appl. No.: 17/478,412

(22) Filed: Sep. 17, 2021

(65) Prior Publication Data

US 2022/0072887 A1    Mar. 10, 2022

Related U.S. Application Data

(62) Division of application No. 16/888,307, filed on May 29, 2020, now Pat. No. 11,167,578.

(30) Foreign Application Priority Data

Mar. 16, 2020 (CN) .......................... 202010182230.X

(51) Int. Cl.
*B41M 5/00* (2006.01)
*B44C 1/17* (2006.01)
(Continued)

(52) U.S. Cl.
CPC .......... *B41M 5/007* (2013.01); *B41M 5/0047* (2013.01); *B44C 1/1704* (2013.01);
(Continued)

(58) Field of Classification Search
CPC ... B41M 5/007; B41M 5/0047; B44C 1/1704; B44F 9/04; C04B 41/61; C04B 26/18;
(Continued)

(56) References Cited

U.S. PATENT DOCUMENTS 7,108,890 B2 * 9/2006 Horne ...................... B44C 5/06
427/258
8,501,069 B1 * 8/2013 Williamson ....... B29D 99/0021
264/308

(Continued)

FOREIGN PATENT DOCUMENTS

CN          109369068 A  *  2/2019  ............. C04B 26/18

*Primary Examiner* — Yaovi M Ameh
(74) *Attorney, Agent, or Firm* — SHEPPARD, MULLIN, RICHTER & HAMPTON LLP

(57) ABSTRACT

An artificial textured stone slab and methods for manufacturing thereof, the method comprising the following steps: Step S01: using a printer to print an image in accordance with the size of an artificial stone slab to arrive at a print of the image; Step S02: placing the front face of the print onto a side of the artificial stone slab and smoothing out the print on the artificial stone slab; Step S03: feeding the artificial stone attached to the print into a heat and ink transferring machine and using the upper and lower clamp plates of the heat and ink transferring machine to tightly clamp the print to the artificial stone slab; Step S04: heating the artificial stone slab to 120° C. to 185° C. and maintaining for the temperature constant for 5-15 minutes, wherein the ink on the print is transferred onto the surface of the artificial stone slab; and Step S05: feeding the artificial stone slab, heated in accordance with the above step, out of the heat and ink transferring machine, removing the print, and cooling the artificial stone slab to room temperature.

9 Claims, 2 Drawing Sheets

(51) Int. Cl.
   *B44F 9/04*     (2006.01)
   *C04B 41/61*    (2006.01)
   *C04B 26/18*    (2006.01)
   *C04B 41/00*    (2006.01)
   *C04B 41/45*    (2006.01)
   *C04B 111/54*   (2006.01)

(52) U.S. Cl.
   CPC ............... *B44F 9/04* (2013.01); *C04B 26/18* (2013.01); *C04B 41/009* (2013.01); *C04B 41/4505* (2013.01); *C04B 41/61* (2013.01); *C04B 2111/542* (2013.01)

(58) Field of Classification Search
   CPC .............. C04B 41/009; C04B 41/4505; C04B 2111/542
   See application file for complete search history.

(56) References Cited

U.S. PATENT DOCUMENTS

| | | | |
|---|---|---|---|
| 11,167,578 B2* | 11/2021 | Ding | ................. B41M 5/007 |
| 2006/0278332 A1 | 12/2006 | Segall et al. | |
| 2011/0132529 A1* | 6/2011 | Narotamo | ........... B32B 37/1018 |
| | | | 156/230 |
| 2011/0206848 A1* | 8/2011 | Sims | ................. B41M 5/025 |
| | | | 427/256 |
| 2015/0314475 A1* | 11/2015 | Banus | ................. B30B 15/024 |
| | | | 425/405.1 |

* cited by examiner

| S01 | A material image is selected for printing, wherein a plotter printer is used to print the material image according to the size specifications of a corresponding artificial stone slab and a drawing of the material image with the corresponding size specification is obtained. |

| S02 | A front side of the printed material image drawing is placed on one surface of the artificial stone slab, wherein the entirety of the material image drawing and the artificial stone fit smoothly. |

| S03 | The artificial stone attached to the material image drawing is sent to a slab heating ink infiltration machine, wherein the upper and lower interlayer equipment in the slab heat transfer machine are used to clamp the material image drawing to the artificial stone slab. |

| S04 | The above artificial stone slab is heated to 120°C to 185°C and a constant temperature is maintained for 5 to 15 minutes, wherein the ink on the material image drawing is transferred to the surface where the artificial stone slab and the material drawing are attached. |

| S05 | The heated artificial stone is sent out of the slab heat transfer machine, wherein the drawing of the attached material picture is removed, and the artificial stone slab is left to cool to room temperature. |

FIG. 1

ARTIFICIAL TEXTURED STONE SLAB AND METHODS OF MANUFACTURING THEREOF

CROSS-REFERENCE TO PRIOR APPLICATION

This application is a Divisional of U.S. application Ser. No. 16/888,307, filed May 29, 2020 which claims the benefit of foreign priority under 35 U.S.C. § 1.119 to Chinese Patent Application No. CN 202010182230.X, filed Mar. 16, 2020, which is incorporated by reference herein in its entirety

FIELD

The present invention relates to the technical field of artificial stone materials, in particular to an artificial textured stone slab and methods of manufacturing thereof.

BACKGROUND

With the development of the Chinese economy and the improvement in people's quality of life, demand for decorative building materials is becoming higher and higher. Of these materials, the use of stone is relatively extensive. Stone, as a decorative material, is generally classified as either natural stone or artificial stone. At present, natural stone, such as marble, offers a beautiful texture and vivid colors and is widely used for building interior walls. Natural marble is limited in its application due to its high price, high density, fragility, and radioactivity. Over-exploitation of natural stone has brought irreparable ecological damage to the environment, and high-end natural stone is nearing a state of exhaustion, resulting in an extreme shortage of goods in the domestic and foreign stone markets. For this reason, artificial stone material has been developed to imitate natural marble. This artificial stone material, a substitute for natural marble, has the advantages of low price, light weight, good mechanical properties, and no radioactivity. The artificial stone material re-cements gravel or stone powder into a whole to be used as a building material.

At present, the conventional method for manufacturing the textured effect of artificial stone materials is to mix color pastes of different colors and sand powder particles to produce different color mixtures. Afterwards, a combination of various color mixtures and various textured effects are formed through various different processes.

The richer the colors used in the conventional artificial stone texture process, the more types of color mixtures that are required, increasing the difficulty of slab manufacturing. At the same time, the conventional artificial stone process has a low degree of automation, and most complex processes require manual operations. As such, it is difficult to make textured effects stable and consistent, and the traces of manufacturing are obvious, making it difficult to achieve the natural textured effects of natural stone. These problems have long troubled the development of conventionally artificial stone materials.

SUMMARY

Based on the problems existing in the prior art, the purpose of the present invention is to propose a method of copying the realistic textured effect of natural stone onto artificial stone to achieve a more aesthetic decorative effect and to ensure that the performance of the slab meets standards with quality that is more stable and easier to control.

The present method of producing the texture of an artificial stone slab reduces costs and improves quality.

The present invention provides a method of manufacturing the texture of an artificial stone slab, comprising the following steps:

A method of manufacturing the texture of an artificial stone slab, comprising the following steps:

Step S01: using a printer to print an image in accordance with the size of an artificial stone slab to arrive at a print of the image;

Step S02: placing the front face of the print onto a side of the artificial stone slab and smoothing out the print on the artificial stone slab;

Step S03: feeding the artificial stone attached to the print into a heat and ink transferring machine and using the upper and lower clamp plates of the heat and ink transferring machine to tightly clamp the print to the artificial stone slab;

Step S04: heating the artificial stone slab to 120° C. to 185° C. and maintaining for the temperature constant for 5-15 minutes, wherein the ink on the print is transferred onto the surface of the artificial stone slab; and Step S05: feeding the artificial stone slab, heated in accordance with the above step, out of the heat and ink transferring machine, removing the print, and cooling the artificial stone slab to room temperature.

Compared with the prior art, the present invention has the beneficial effect that the present invention prints and reproduces natural stone or various other patterns in the artificial stone through automatic heat transfer technology to form a realistic and natural texture comparable to the texture of natural stone or various other aesthetic patterns that achieve a better decorative effect and ensure that the performance of the slab meets standards. As such, the quality is more stable and easier to control.

BRIEF DESCRIPTION OF THE DRAWINGS

FIG. 1 is a flow diagram of a method for manufacturing the texture of an artificial stone slab provided by the present invention.

DETAILED DESCRIPTION OF THE PREFERRED EMBODIMENTS

Figure 2:
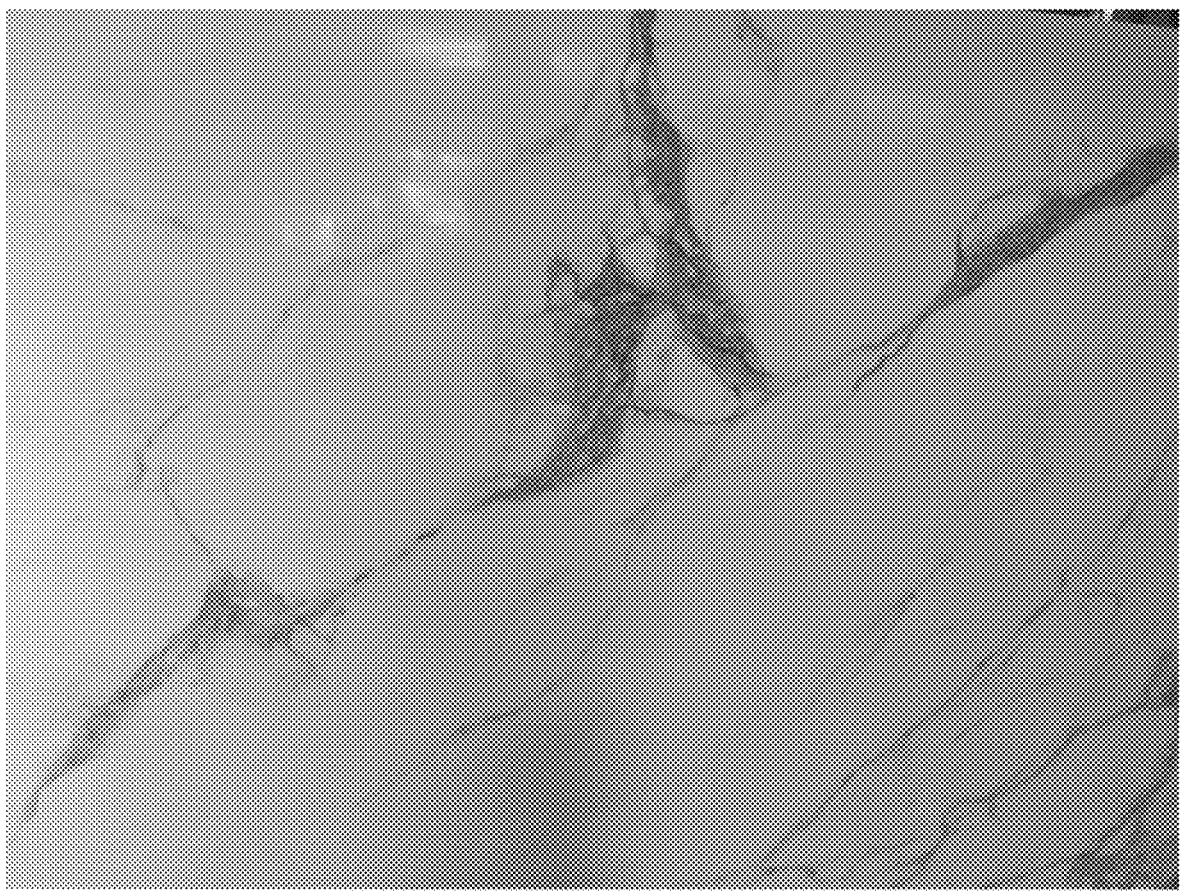
FIG. 2 is a photograph of the surface texture of an artificial stone slab imitating natural stone obtained by the manufacturing method of the present invention for the texture of an artificial stone slab.

The technical solutions in the embodiments of the present invention will be described clearly and completely in combination with the drawings in the embodiments of the present invention. Naturally, the described embodiments are only a part of the embodiments of the present invention, but not all the embodiments. Based on the embodiments in the present invention, all other embodiments obtained by those of ordinary skill in the art without creative work fall within the protection scope of the present invention.

With reference to FIG. 1, the present invention provides a method of manufacturing the texture of an artificial stone slab, comprising the following steps:

Step S01: using a printer to print an image in accordance with the size of an artificial stone slab to arrive at a print of the image.

In the present step, the image to be printed can be captured with a digital camera or by scanning natural stone with a scanner. The image is a high-pixel digital image, for example, with pixels of 2600 DPI, such that the image is clearer. Based on actual texture needs, different natural stones can be used to obtain different images, and the size of the corresponding artificial stone slab can be set according to the actual application and needs. In the present embodiment, it is preferable that the size of the print with the corresponding size specification is equal to the size specification of the corresponding artificial stone slab. For example, if the size of the corresponding artificial stone slab is 3240*1620 mm (length*width), then the corresponding specification of the drawing of the obtained image is 3240*1620 mm (length*width); alternatively, for example, if the size of the corresponding artificial stone slab is 2500*1500 mm (length*width), then the corresponding specification of the drawing of the obtained image is 2500*1500 mm (length*width). In other embodiments, the corresponding specifications of the drawings of the obtained images may be larger than the corresponding artificial stone slab size specifications or may be smaller than the corresponding artificial stone slab size specifications.

Step S02: placing the front face of the print onto a side of the artificial stone slab and smoothing out the print on the artificial stone slab. In the present embodiment, the front side of the print refers to the side that the printer sprays with ink, and the front side of the print directly contacts a surface of the artificial stone slab. After step S01 and before the present step S02, the present embodiment also includes polishing of the surface of the artificial stone slab that is attached to the front of the image drawing and ensuring that the roughness of the surface of the artificial stone slab that fits the front of the print is less than 100 μm. After verification that the roughness is less than 100 μm, the drawing and the slab will be pressed closer together so that a better textured effect can be applied to the artificial stone slab.

In the present step, it is preferable that the size of the print with the corresponding size specification is equal to the size specification of the artificial stone slab material. As such, the edge of the print and the edge of the manufactured slab can be matched and correspondingly attached. In other embodiments, when the corresponding specifications of the print are bigger than the corresponding artificial stone slab, the print needs to be cropped. When the corresponding specifications of the image drawing is smaller than the corresponding artificial stone slab, the image drawing can be attached to the section of the artificial stone that requires the texture. In this way, it is possible to increase flexibility in selecting the position of the texture on the artificial stone material.

Step S03: feeding the artificial stone attached to the print into a heat and ink transferring machine and using the upper and lower clamp plates of the heat and ink transferring machine to tightly clamp the print to the artificial stone slab. In the present step, the upper and lower clamp plates are respectively in contact with a surface of the image drawing and a surface of the artificial stone slab. Furthermore, the area of the upper and lower clamp plates is larger than the area of the print and the artificial stone slab and completely covers the print and the artificial stone slab, respectively.

Step S04: heating the artificial stone slab to 120° C. to 185° C. and maintaining for the temperature constant for 5-15 minutes, wherein the ink on the print is transferred onto the surface of the artificial stone slab. In the present step, the artificial stone slab is heated to 120° C. to 185° C., for example, 160° C., under the conditions of room temperature and standard atmospheric pressure. As such, the ink on the print penetrates the surface of the manufactured slab that contacts the print.

By heating the artificial stone slab at room temperature and atmospheric pressure, the manufacturing conditions are more convenient and good results can be achieved. In other embodiments, heating can also be performed in a vacuum environment.

Specifically, the penetration depth of the ink on the print onto the artificial stone slab is between 1 and 5 mm. The penetration depth range is from the surface where the manufactured slab and the image meet to the vertical distance inside the artificial stone. It has been proved by experiment that the preferred stone slab is preferably 12 to 30 mm thick. Within this thickness range, heating between 120° C. and 185° C. allows for a penetration depth range between 1 mm and 5 mm. Within this penetration depth range, the application of the ink on the artificial stone is highly stable and does not fade.

Step S05: feeding the artificial stone slab, heated in accordance with the above step, out of the heat and ink transferring machine, removing the print, and cooling the artificial stone slab to room temperature. In the present step, the artificial stone slab is cooled under standard atmospheric pressure at room temperature.

The printer and the heating and ink transferring machine used in the texture of an artificial stone slab manufacturing method of the present invention constitute an automatic heat transfer machine. The printer is a large-scale automatic printing device equipped with special water-based ink, special printing paper, and graphics processing software that can print drawings with a width of 1620 mm and below, for example, 1600 mm. The heating and ink transferring machine has an upper and lower interlayer structure and artificial stone slabs of 3240*1620 mm and below with a thickness of 12 mm to 30 mm, for example 3200*1600*20 mm, can be fed into the machine and can be heated to a temperature of 120° C. to 185° C., for example, 160° C.

In the present embodiment, the water-based ink is water-soluble ink of the three colors of red, yellow, and blue, having the characteristics of strong coloring power and strong adhesion, such that it easily penetrates into the artificial stone slab.

Artificial stone slabs, including artificial stone and manufactured granite, are composed of main materials and auxiliary materials. The main material, according to the total weight ratio of raw materials, comprises from about 0% to about 50% of particles containing hydroxide or metal oxide, from about 30% to about 90% of natural quartz, and from about 9% to about 20% of resin. The auxiliary material comprises a coupling agent, a curing agent, and a colored pigment, wherein the weight ratio of the coupling agent to the resin is from about 0.6:100 to about 2:100, the weight ratio of the curing agent to the resin is from about 0.6:100 to about 2:100, and the weight ratio of the colored pigment to the slab is from about 0% to about 1.5%.

Specifically, the particles containing hydroxide or metal oxide more preferably account for 0% to 50% of the weight ratio of the main material, for example, 45%, and wherein the metal oxide or hydroxide particles include particle mesh sizes of 4-6, 6-8, 8-16, 16-26, 26-40, 40-70, 70-120, 120-200, and 325/400. The present invention replaces part or all of the natural quartz particles with particles containing metal oxide or hydroxide and ensures that the performance of the slab meets standards, that the quality is more stable and easier to control, and that the decorative effect is better. Furthermore, it has been proven that the stability of the combination of metal oxide or hydroxide and water-based ink is high, and the primary stability of combination is significantly higher than that of artificial stone slabs containing only natural quartz; moreover, the resulting texture has high stability.

The natural quartz is quartz sand or quartz powder, that has a crystal structure and is formed by crushing and sieving natural quartz ore, and the main component of which is SiO2 and wherein the natural quartz more preferably accounts for 80% to 90% of the weight ratio of the main material, for example, 85%, and the particle mesh size range includes 4-6, 6-8, 8-16, 16-26, 26-40, 40-70, 70-120, 120-200, and 325/400.

Specifically, the resin more preferably accounts for 10% to 15%, for example, 12%, of the weight ratio of the main material and wherein the resin is an unsaturated polyester resin selected from, for example, one or more of the group consisting of polyester resin, composite acrylic resin, and vinyl resin, wherein the coupling agent is a silane coupling agent, and the curing agent is a peroxide or a mixture of peroxides. Preferably, the coupling agent is selected from one or more of the group consisting of y-methacryloxypropyltrimethoxysilane, y-(2,3-epoxypropoxy)-propyl]-trimethoxysilane, N-(aminoethyl)-y-aminopropylmethyldimethoxysilane, vinyl triethoxysilane, vinyl trimethoxysilane, and y-aniline methyl triethoxysilane. The curing agent is selected from one or more of the group consisting tert-butyl peroxy-2-ethylhexanoate, methyl ethyl ketone peroxide, tert-butyl peroxybenzoate, cyclohexanone peroxide, and benzoyl peroxide.

Further, the colored pigment is one or more of inorganic pigment, organic pigment or color paste.

Embodiment 1

A 3200*1600 mm (length*width) drawing of an image is printed using a printer, and a 3200*1600 mm (length*width) artificial stone slab is prepared. The front of the print (that is, the printed side) is laid against the polished surface of the slab (the roughness of which is 65 μm), smoothly and without wrinkles. Then, the drawing and slab are fed into the upper and lower clamp plates of the heating and ink transferring machine for clamping. The upper clamping equipment of the upper and lower clamp plates is heated to 160° C. for 10 minutes so that the ink on the print penetrates into the surface of the artificial stone. The upper and lower clamping devices are released, the artificial stone slab is removed from the upper and lower clamp plates, and the print is removed. The pattern on the print has penetrated and been copied onto the surface of the artificial stone slab, and the slab is cooled to room temperature.

Embodiment 2

A 3200*1600 mm (length*width) drawing of an image is printed using a printer, and a 2600*1200*25 mm (length*width*thickness) artificial stone slab is prepared. The front of the print (that is, the printed side) is laid against the polished surface of the slab (the roughness of which is 45 μm), smoothly and without wrinkles. The print is cut so that its size is 2600*1200, and its edges are completely aligned with the edges of the material stone slab. Then, the drawing and slab are fed into the upper and lower clamp plates of the heating and ink transferring machine for clamping. The upper clamping equipment of the upper and lower clamp plates is heated to 180° C. for 15 minutes so that the ink on the print penetrates into the surface of the artificial stone. The upper and lower clamping devices are released, the artificial stone slab is removed from the upper and lower clamp plates, and the print is removed. The pattern on the print is penetrated and is copied onto the surface of the artificial stone slab, and the slab is cooled to room temperature.

Please refer to FIG. 2, which is an image of the textured effect of the artificial stone slab obtained in the present embodiment 1. It has stable colors, strong inking strength and penetration, a clear and natural texture, superb decorative effect, and is quite close to the textured effect of natural stone. The method of the present invention has the advantages of high efficiency, fast production, and the outstanding properties of a manufactured natural quartz slab, such as high hardness, scratch resistance, stable chemical properties, and high strength.

The above embodiments only express one or several embodiments of the present invention, the descriptions of which are more specific and detailed. This is not to be construed as limited the scope of the invention patent. It should be noted that, for those of ordinary skill in the art, many variations and improvements can be made without departing from the concept of the present invention, all of which fall within the protection scope of the present invention. Therefore, the protection scope of the present invention patent shall be subject to the appended claims.

The invention claimed is:

1. A textured artificial stone slab produced by:
using a printer to print an image in accordance with the size of an artificial stone slab to arrive at a print of the image;
placing the front face of the print onto a side of the artificial stone slab and smoothing out the print on the artificial stone slab;
feeding the artificial stone attached to the print into a heat and ink transferring machine and using the upper and lower clamp plates of the heat and ink transferring machine to tightly clamp the print to the artificial stone slab;
heating the artificial stone slab to 120° C. to 185° C. and maintaining for the temperature constant for 5-15 minutes, wherein the ink on the print is transferred onto the surface of the artificial stone slab; and
feeding the artificial stone slab, heated in accordance with the above step, out of the heat and ink transferring machine, removing the print, and cooling the artificial stone slab to room temperature;
wherein the artificial stone slab is composed of a main material and an auxiliary material, wherein the main material, according to the total weight ratio of raw materials, comprises from about 0% to about 50% of particles containing hydroxide or metal oxide, from about 30% to about 90% of natural quartz, and from about 9% to about 20% of resin, and wherein the auxiliary material comprises a coupling agent, a curing agent, and a colored pigment, wherein the weight ratio of the coupling agent to the resin is from about 0.6:100 to about 2:100, the weight ratio of the curing agent to the resin is from about 0.6:100 to about 2:100, and the weight ratio of the colored pigment to the slab is from about 0% to about 1.5%.

2. The textured artificial stone slab of claim 1, wherein the artificial stone slab is heated at room temperature and atmospheric pressure.

3. The textured artificial stone slab of claim 1, wherein the artificial stone slab has a width of less than or equal to 1620 mm and a thickness range that is 10 mm to 30 mm.

4. The textured artificial stone slab of claim 1, wherein the ink of the print penetrates the artificial stone slab at a depth of between 1 mm and 5 mm.

5. A textured artificial stone slab comprising a main material, an auxiliary material, and a printed drawing having a water-based ink;
 wherein the main material comprises from about 0% to about 50% total weight of particles containing a hydroxide or metal oxide, from about 30% to about 90% total weight of a natural quartz, and from about 9% to about 20% total weight of a resin;
 wherein the auxiliary material comprises a coupling agent, a curing agent, and a colored pigment;
 wherein the weight ratio of the colored pigment to the slab is from about 0% to about 1.5%;
 wherein the colored pigment is one or more of inorganic pigment, organic pigment or color paste; and
 wherein the water-based ink penetrates a depth of between about 1 mm and about 5 mm on the outer surface of the artificial stone stab.

6. The textured artificial stone slab of claim 5, wherein the artificial stone slab has a width of less than or equal to 1620 mm and a thickness range that is 10 mm to 30 mm.

7. The textured artificial stone slab of claim 5, wherein the artificial stone slab has a width of less than or equal to 1620 mm and a thickness range that is 10 mm to 30 mm.

8. The textured artificial stone slab of claim 5, wherein the resin is an unsaturated polyester resin selected from one or more of the group consisting of polyester resin, composite acrylic resin, and vinyl resin.

9. The textured artificial stone slab of claim 5, wherein the coupling agent is a silane coupling agent selected from one or more of the group consisting of y-methacryloxypropylt-rimethoxysilane, y-(2,3-epoxypropoxy)-propyl]trimethox-ysilane, N-(aminoethyl)-y-aminopropylmethyldimethoxysi-lane, vinyl triethoxysilane, vinyl trimethoxysilane, and y-aniline methyl triethoxysilane.

* * * * *